United States Patent
Waysbort et al.

(10) Patent No.: US 11,521,289 B2
(45) Date of Patent: *Dec. 6, 2022

(54) GRAPHICAL USER INTERFACE (GUI) FOR IMPLEMENTING CONTROLS FOR GEOGRAPHIC CONVEYANCE

(71) Applicant: GT Gettaxi Limited, Limassol H.E. (CY)

(72) Inventors: Nir Waysbort, Ramat Gan (IL); Yael Lipskin-Moshe, Kfar Saba (IL); Eliya Aharoni, Nofim (IL)

(73) Assignee: GT Gettaxi Systems Ltd, Tel Aviv (IL)

( * ) Notice: Subject to any disclaimer, the term of this patent is extended or adjusted under 35 U.S.C. 154(b) by 150 days.

This patent is subject to a terminal disclaimer.

(21) Appl. No.: 16/782,887

(22) Filed: Feb. 5, 2020

(65) Prior Publication Data

US 2020/0175636 A1 Jun. 4, 2020

Related U.S. Application Data

(63) Continuation of application No. 15/342,932, filed on Nov. 3, 2016, now Pat. No. 10,586,300.

(Continued)

(51) Int. Cl.
*H04L 29/08* (2006.01)
*G06F 3/048* (2013.01)
(Continued)

(52) U.S. Cl.
CPC .............. *G06Q 50/30* (2013.01); *G06F 3/048* (2013.01); *G06Q 40/12* (2013.12); *G06F 3/0484* (2013.01)

(58) Field of Classification Search
CPC ........ G06Q 50/30; G06Q 40/12; G06F 3/048; G06F 3/0484
See application file for complete search history.

(56) References Cited

U.S. PATENT DOCUMENTS 8,285,570 B2 * 10/2012 Meyer ..................... G06Q 50/14
705/5
8,612,273 B2 * 12/2013 Johnson ............. G06Q 10/0631
705/400

(Continued)

FOREIGN PATENT DOCUMENTS

WO 2015048338 A1 4/2015

OTHER PUBLICATIONS

Non-Final Office Action dated Apr. 4, 2019, on U.S. Appl. No. 15/342,932.

(Continued)

*Primary Examiner* — Talia F Crawley
(74) *Attorney, Agent, or Firm* — Lowenstein Sandler LLP

(57) ABSTRACT

A method includes receiving, by a processing device, one or more transportation parameters for a user type. The method further includes receiving, by the processing device from a client computing device associated with a user associated with the user type, a transportation request for a transportation vehicle and comparing, by the processing device, the transportation request to the one or more transportation parameters. The method further includes prohibiting, by the processing device, communication of the transportation request to one or more vehicle computing devices responsive to the transportation request not satisfying the one or more transportation parameters.

19 Claims, 12 Drawing Sheets

Related U.S. Application Data

(60) Provisional application No. 62/253,350, filed on Nov. 10, 2015.

(51) Int. Cl.
  *G06Q 50/30* (2012.01)
  *G06Q 40/00* (2012.01)
  *G06F 3/0484* (2022.01)

(56) References Cited

U.S. PATENT DOCUMENTS

| | | | | |
|---|---|---|---|---|
| 10,438,137 | B2* | 10/2019 | Ratti | G06Q 10/063118 |
| 10,635,994 | B2* | 4/2020 | Marueli | G06Q 50/01 |
| 2002/0099599 | A1* | 7/2002 | Minassian | G06Q 10/08 |
| | | | | 705/13 |
| 2002/0174030 | A1* | 11/2002 | Praisner | G07F 7/08 |
| | | | | 705/39 |
| 2003/0088487 | A1* | 5/2003 | Cheng | G06Q 40/025 |
| | | | | 705/30 |
| 2006/0129412 | A1* | 6/2006 | Boss | G06Q 10/063 |
| | | | | 705/35 |
| 2007/0276595 | A1* | 11/2007 | Lewinson | G01C 21/3438 |
| | | | | 701/533 |
| 2008/0091342 | A1* | 4/2008 | Assael | G01C 21/3438 |
| | | | | 701/533 |
| 2009/0326991 | A1* | 12/2009 | Wei | G06Q 10/08355 |
| | | | | 705/5 |
| 2010/0153279 | A1* | 6/2010 | Zahn | G06Q 10/025 |
| | | | | 705/5 |
| 2011/0010401 | A1 | 1/2011 | Adams et al. | |
| 2011/0153629 | A1* | 6/2011 | Lehmann | G06Q 30/06 |
| | | | | 707/E17.014 |
| 2011/0173251 | A1 | 7/2011 | Sandhu et al. | |
| 2012/0123894 | A1* | 5/2012 | Tsai | G06Q 30/0611 |
| | | | | 705/26.4 |
| 2013/0179205 | A1* | 7/2013 | Slinin | G06Q 10/06 |
| | | | | 705/7.13 |
| 2013/0290426 | A1 | 10/2013 | Sorensen | |
| 2014/0095234 | A1* | 4/2014 | Johnson | G06Q 10/02 |
| | | | | 705/7.12 |
| 2014/0195927 | A1 | 7/2014 | DeWeese et al. | |
| 2015/0112745 | A1* | 4/2015 | Wang | G06F 16/29 |
| | | | | 705/7.15 |
| 2015/0161564 | A1* | 6/2015 | Sweeney | G06Q 50/30 |
| | | | | 705/338 |
| 2015/0199633 | A1* | 7/2015 | Convertino | G06Q 10/06313 |
| | | | | 705/7.23 |
| 2015/0248689 | A1* | 9/2015 | Paul | G06Q 50/30 |
| | | | | 705/14.23 |
| 2016/0223347 | A1* | 8/2016 | Ricci | G07C 5/02 |
| 2016/0314437 | A1* | 10/2016 | Patitucci | G06Q 10/1057 |
| 2017/0169622 | A1* | 6/2017 | Marueli | G06Q 50/30 |
| 2018/0118164 | A1* | 5/2018 | Wood | H04W 4/024 |

OTHER PUBLICATIONS

Notice of Allowance dated Oct. 29, 2019, on U.S. Appl. No. 15/342,932.
The extended European Search Report dated Apr. 12, 2017, on application No. 16198044.6 1879.
Russian Search Report for Application No. 2016143989/07(070500) dated Nov. 28, 2017.

* cited by examiner

900

> Receive, from the GUI of the first client device, a first warning percentage threshold corresponding to the travel expense limit and a second warning percentage threshold corresponding to the travel duration limit
> 910

> Transmit, via a warning GUI, a warning notice to the second client device responsive to the user exceeding at least one of the first warning percentage threshold or the second warning percentage threshold
> 920

> Receive, from the first client device, a first travel time restriction for the role, wherein the first travel time restriction indicates a time interval during which users associated with the role may travel
> 940

> Determine that the first travel time restriction does not comprise a transportation time associated with the first transportation request
> 950

> In response to the determining, transmitting a message to the second client device indicating that the requested transportation is not allowed, and prohibiting the second client device from sending the second transportation request to the third client device
> 960

*Fig. 9B*

GRAPHICAL USER INTERFACE (GUI) FOR IMPLEMENTING CONTROLS FOR GEOGRAPHIC CONVEYANCE

RELATED APPLICATION

This application is a continuation application of U.S. patent application Ser. No. 15/342,932, filed Nov. 3, 2016, which claims the benefit of Provisional Application No. 62/253,350, filed Nov. 10, 2015, the entire contents of both are hereby incorporated by reference herein.

TECHNICAL FIELD

The present disclosure is generally related computing devices, and is more specifically related to a graphical user interface of a computing device for implementing controls for geographic conveyance.

BACKGROUND

Geographic conveyance, such as transportation services, may be managed and monitored via one or more computing devices. These computing devices may provide graphical user interface (GUIs) to more easily and conveniently interface with the service providing the geographic conveyance. For example, the GUIs may allow users to request a pick-up by a driver of a transportation vehicle, cancel the request, and pay for the service.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 9A is a flow diagram illustrating a graphical user interface for implementing controls for geographical conveyance processing flow, according to an implementation.

FIG. 9B is a flow diagram illustrating a travel policy controls travel time restriction for an employee rides processing flow, according to an implementation.

DETAILED DESCRIPTION

Figure 1:
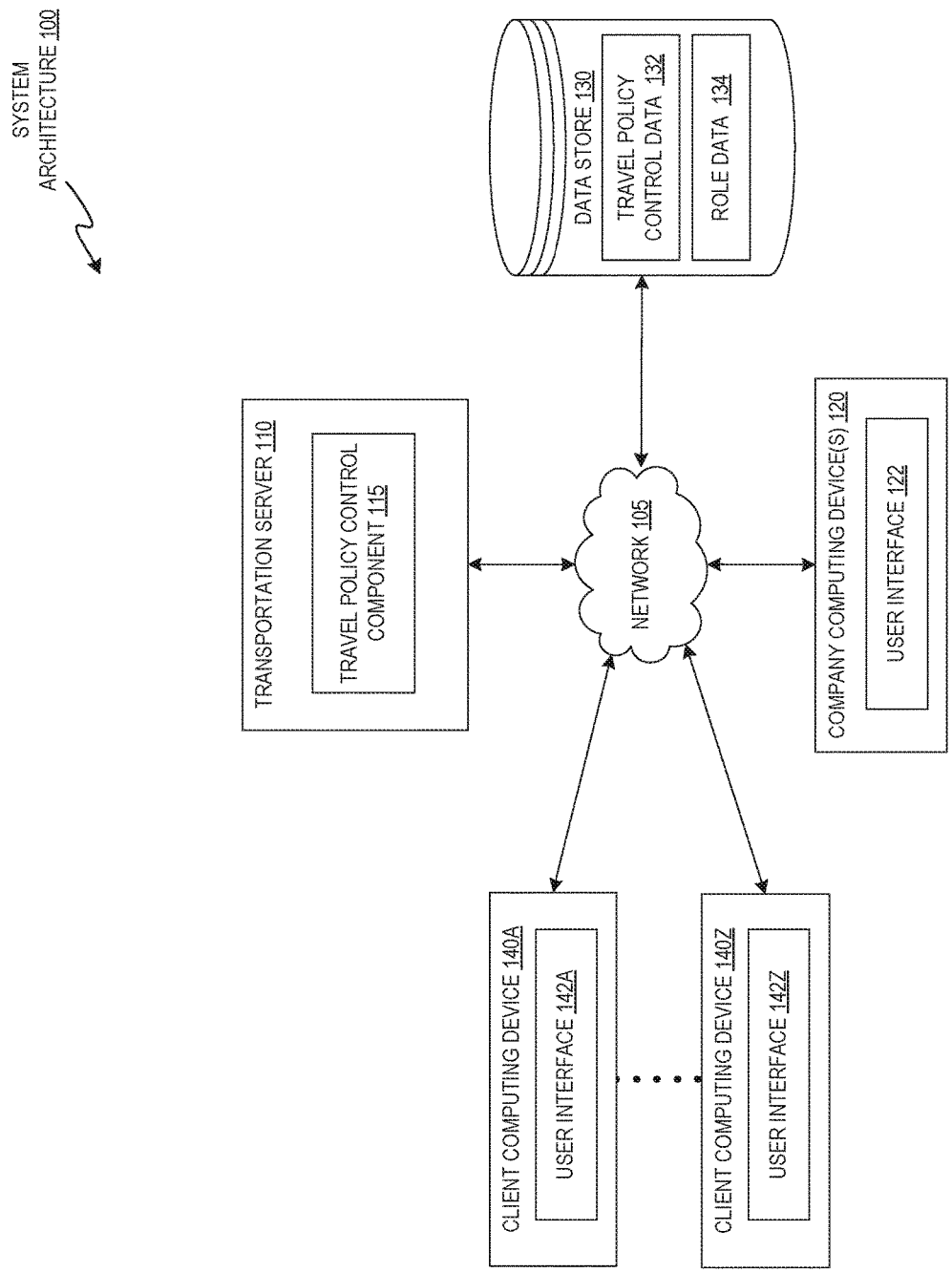
FIG. 1 is a block diagram illustrating an exemplary network architecture in which embodiments of the present disclosure may be implemented.

Described herein are systems and methods for an improved graphical user interface (GUI) for implementing controls for geographic conveyance. In one implementation, the controls for geographic conveyance may refer to travel policy controls for geographic conveyances (e.g., car service, rides, etc.) for employee(s) of an organization.

Organizations (e.g., companies, etc.) that use public transportation for their employees (also referred to herein as "users"), or other transportation services such as ridesharing and taxi services, may not be able to adequately and efficiently control and manage their employees' transportation options. As a result, these companies may not be able to plan a monthly and/or yearly budget in advance, nor can they control how much time and money employees are spending on transportation costs. Furthermore, there does not currently exist a GUI that allows a company to efficiently handle these types of operations. The operations described herein improve computer systems and the software arts by providing a GUI that quickly and efficiently allows for company transportation roles and rules defined by the roles to be created and implemented. The GUIs described herein result in a better overall user experience on a computing device.

In implementations of the disclosure, a monthly expense control feature allows companies using a travel service to define maximum monetary amounts for their employees' monthly travel expenses. It should be noted that although the term "companies" is used throughout this description for convenience, the operations and GUIs described herein are equally applicable to all organizations and individuals. Advantageously, setting travel expense limits allows companies to better plan a yearly travel budget. In one embodiment, a user setting travel limits can create roles via a GUI. A role may define a class (e.g., group) of employees at a particular company. For example, an "executive role" may be created for top level employees, while a "standard role" may be created for lower-level employees. In this way, different expense, transportation class, and travel time limits may be established for various levels of employees within a company. A role may be defined according to the company's policy (e.g., allowed traveling hours, allowed transportation types (classes), and/or allowed monthly rides budget). Each employee can be assigned to a specific role and restricted to the permissions and limits granted by the role to which they are assigned.

Once a budget, time constraint, and/or other limitation is defined, a company may also define threshold percentages of the budget, time limit, and/or other limitation. Responsive to a user exceeding or requesting to exceed a threshold within a predefined time period (e.g., one month), the employee may be notified that his or her limitation is about to be exceeded or has already been exceeded. In one embodiment, when a budget or traveling hours limit is exceeded (or is to be exceeded by the transportation requested by a user), no business rides are allowed for the user until the predefined time period expires and the budget and/or the traveling hours limit is reset. In one embodiment, a company administrator may review the deviations from the budget and/or traveling hours limit in a monthly report.

It is noted that implementations for improved GUIs for implementing controls for geographic conveyance are illustrative, and that other operations of carrying out the described implementations may be used.

FIG. 1 illustrates an example system architecture 100, in accordance with an implementation of the disclosure. The system architecture 100 includes a transportation server 110, company computing device(s) 120, a data store 130, and client computing devices 140A-140Z. The components 110-160 may be communicatively connected via a network 105, which is described in greater detail below.

In one implementation, the transportation server may correspond to one or more computing devices (e.g., a rackmount server, a router computer, a server computer, a personal computer, a mainframe computer, a laptop computer, a tablet computer, a desktop computer, etc.), data stores (e.g., hard disks, memories, databases), networks, software components, and/or hardware components. The transportation server 110 may include a travel policy control component 115 (which may be executed by a processing device of the transportation server 110) that is capable of implementing company travel policies received from company computing device 120 and enforcing the company travel policies at client computing devices 140A-140Z with respect to business travel (e.g., a transportation order request, etc.).

In some implementations, the travel policy control component 115 may be implemented on a different device than transportation server 110. For example, in some implementations, one or more of the company computing devices 120 and/or client computing devices 140A-140Z may implement the travel policy control component 115 (or at least some of the functionality of the travel policy control component 115). In some implementations, some or all of the functionality of the travel policy control component 115 may be distributed across one or more of the company computing devices 120, and/or one or more of the client computing devices 140A-140Z. In some implementations, the transportation server 110 may be omitted from the system architecture 100. In some implementations, more than one transportation server 110 may be included in the system architecture 100.

In one implementation, company computing devices 120 may include computing devices such as server devices, personal computers (PCs), laptops, mobile phones, smart phones, tablet computers, netbook computers, etc. Company computing devices 120 may be used by an organization or company as part of performing the business of the company.

Client computing devices 140A-140Z may include computing devices such as personal computers (PCs), laptops, mobile phones, smart phones, tablet computers, netbook computers, etc. The client computing devices 140A-140Z may also be referred to as "user devices." An individual user may be associated with (e.g., own and/or use) one or more of the client computing devices 140A-140Z, and the client computing devices 140A-140Z may each be owned and utilized by different users at different locations. As used herein, a "user" may refer generally to an individual operator of one or more of the client computing devices 140A-140Z and/or company computing devices 120.

The company computing devices 120 and the client computing devices 140A-140Z may each implement one of user interfaces 122 and 142A-142Z. In some implementations, the user interfaces 142A-142Z may allow their respective company computing devices 120 or client computing devices 140A-140Z to interact directly with the transportation server 110. For example, an order request for a transportation vehicle (e.g., a transportation request) may be transmitted from the company computing devices 120 or client computing device 140A to the transportation server 110, along with location information pertaining to the company computing device 120 or client computing device 140A.

Each of user interfaces 122 and 142A-142Z may allow a user of the respective company computing devices 120 or client computing device 140A-140Z to implement and enforce a company travel policy via the transportation server 110. In one implementation, one or more of the user interfaces 122 and 142A-142Z (as well as each of the other user interfaces described herein) may be a standalone application (e.g., a mobile application that runs on a mobile device), which may have been provided by the transportation server 110 (e.g., as a downloadable application to be installed by an administrator), that allows a user to send and receive information to the transportation server 110. In another example, one or more of the user interfaces 122 and 142A-142Z may be a web browser interface that can access, retrieve, present, and/or navigate content (e.g., web pages such as Hyper Text Markup Language (HTML) pages) provided by the transportation server 110. The user interfaces 122 and 142A-142Z and their respective functionality are described in greater detail with respect to FIGS. 2-10

In one implementation, a transportation order is placed from the client computing device 140A-140Z using an order screen. The order screen may be presented via a GUI on the client computing device 140A-140Z. The transportation order may be allowed under the constructs of the travel policy limits described herein. In some implementations, the client computing device 140A-140Z may include global positioning system (GPS) tracking device, which can determine a location of the client computing device 140A-140Z for purposes of pre-filling a location. The transportation order may then be routed to the transportation server 110, which, in turn, communicates the transportation order to one or more vehicle computing devices.

In one implementation, the data store 130 may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers), and may be cloud-based. In some implementations, the data store 130 may be a part of the transportation server 110. In some implementations, the data store 130 may be distributed among and accessible to one or more of the company client devices 120, the transportation server 110, and/or one or more of the client computing devices 140A-140Z. One or more of the devices of the system architecture 100 may utilize the data store 130 to store public and private data. The data store 130 may be configured to provide secure storage for private data.

In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, the network 105 may be a combination of different types of networks. In one implementation, one or more of the company computing devices 120 and/or client computing devices 140A-140Z may communicate directly with each other. For example, the client computing device 140A may include a Bluetooth device that sends/receives data to/from the company computing device 120.

The described implementations of the disclosure provide an improved GUI to allow organizations and/or individuals to implement travel policies and business rules for restricting employees of the organization from booking unallowed rides, based on a profile and role of the employee in the organization. The organization may create roles that define a specific travel policy, including allowed hours and distance for travel, expense amount for travel, classes for travel, and other permissions. Each employee of an organization may then be associated with a role as well as an expiration date for that association of the role to the employee. In some implementations, the organization may also restrict travel options based on reasons for travel. Some implementations also provide predefined options for reference codes for use by the organization in implementing roles for travel policies.

In one example implementation described herein, each organization may have three levels of users, each with different permissions: SuperAdmin, Administrator, and Regular employee. In one implementation, the policy can be edited/created/deleted by a super admin, while admins retain a viewing privilege for the policy. In some implementations, regular employees may not have any access to the policy. In some implementations, an organization may be referred to as a "company".

Figure 2A:
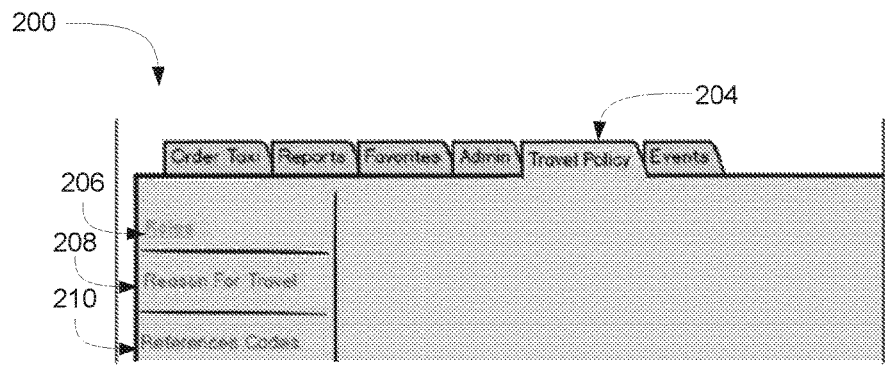
FIG. 2A is a block diagram illustrating a graphical user interface to detailing a travel policy tab, according to an implementation.

FIG. 2A is a screenshot of an exemplary GUI 200 of a company page detailing 'Travel Policy' and including a tab for Travel Policy 204. This tab 204 may contain links to a list of roles of the company 206, reasons for travel 208, and any reference codes for the company 210. The roles feature may be utilized if it is enabled in a company profile page. In one implementation, each company may have three levels of users, each with different permissions: SuperAdmin, Administrator, and Regular employee. In other implementations, various other levels may be used. In one implementation, the policy can be edited/created/deleted by a super admin, while admins retain a viewing privilege for the policy. In some implementations, regular employees may not have any access to the policy. In other implementations, other privacy policies may be used.

In one implementation, a role may be created, edited, and/or deleted by selection (e.g., click, tap, etc.) of a "role" link 206. When deleting a role, the GUI 200 may present a popup requesting confirmation of the deletion. For example, a popup may prompt: "Are you sure you want to delete this role? Yes/No."

When a role is initially created it may be the "default role." In one embodiment, the default role is the role that is assigned to all users before being switched to a different role. Existing employees already stored in a database may be assigned to the default role automatically (e.g., without user interaction). A new employee may be assigned to the default role, unless another role was chosen for the user when the employee profile was created. In one implementation, the default role may not be deletable. In one implementation, when roles have not yet been created, employees may be processed as if no roles exist for the employee, and therefore travel restrictions restriction may not apply.

In one implementation, the role name, including the default role name, is unique and can be edited. When changing the default name, the text "(Default)" may be replaced with the new name. If a role is saved without a name, a popup message may appear. For example, the message may state "Please add role name." The role may also be set on a per employee basis via an employee list, which may be imported (e.g., uploaded to transportation server 110). If a requested role does not exist for the particular company, the employee may not be assigned to the requested role. An error message may be displayed notifying the user that the role does not exist. A role may be deleted if it is not the default role. If it is the default role, the "Delete" option may be disabled. Once a role is deleted, employees previously assigned to the deleted roll may be switched to a default role.

The travel policy associated with a role may be determined by the permission of the role. One such role permission is a Business Classes Control, which indicates the relevant business classes allowed for the company. Business classes may include various car and/or transportation classes available to employees. For example, business classes may be "SUV, Black Car, and Standard." In some implementations, a possible role permission may be Monthly Expenses Control per month. Monthly expenses control per month may include a monthly transportation expense cap per employee. A further role permission may be Travel Time Control Allowed, which may include a monthly transportation time cap per employee.

Figure 2B:
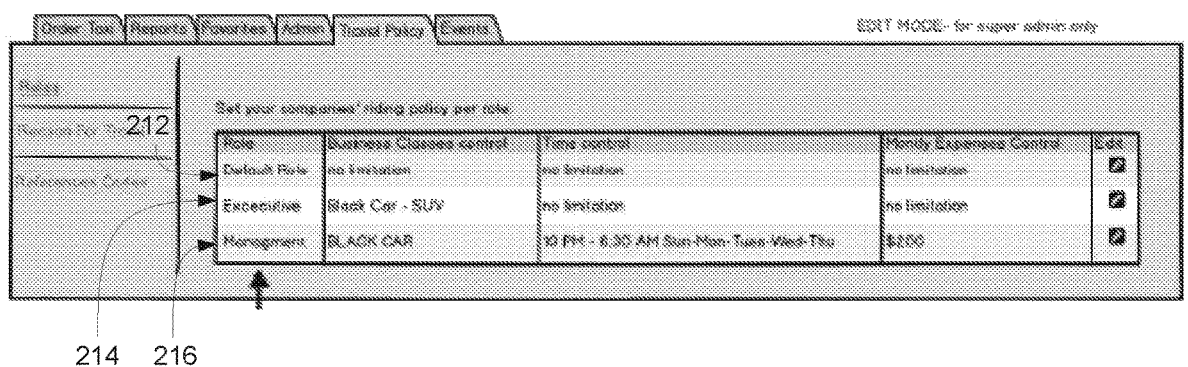
FIG. 2B is a block diagram illustrating a graphical user interface displaying added roles, according to an implementation.

FIG. 2B is a screenshot of an exemplary GUI when roles are added (e.g., Executive 214 and Management 216 roles). In one embodiment, the default role 212 and any other established roles are displayed as described by FIG. 2B responsive to an indication from a user device of a selection of the roles link 206 of FIG. 2B. In one implementation, when the name of a default role is changed, the default role maintains the "(default)" text.

Figure 3A:
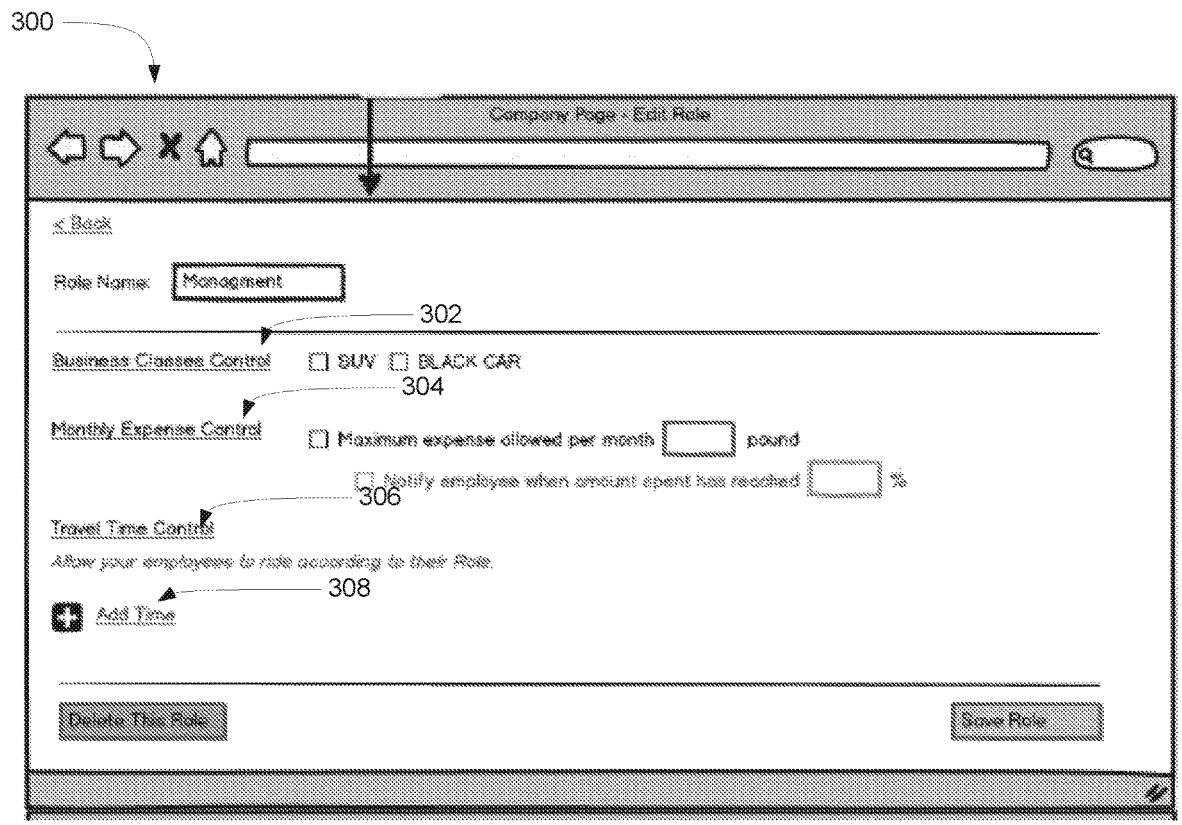
FIG. 3A is a block diagram illustrating a graphical user interface edit role page, according to an implementation.
Figure 3B:
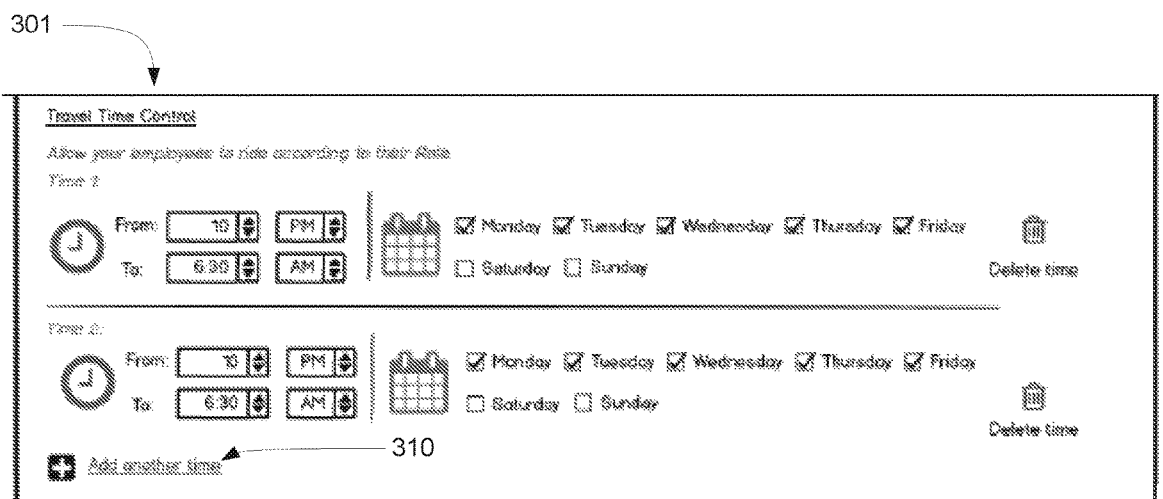
FIG. 3B is a block diagram illustrating a graphical user interface edit time control page, according to an implementation.

FIG. 3A is an exemplary GUI 300 depicting an "edit" page to add or update a role. This GUI may be provided to a user device with role editing privileges upon selection of a link or other indicator to edit an existing role or add a new role (e.g., as shown in FIG. 2B). When adding or editing a role, modifications can be made to the business class 302, monthly expense 304, and travel time controls 306. When an indication is received of a selection of an "Add Time" link 308 and the indication is determined to correspond to a privileged user, the redirect may be provided to a user device of the privileged user to another GUI. The other GUI may be, for example, the exemplary GUI 301 of FIG. 3B. GUI 301 depicts an edit Role Time control dialog. The Role Time control GUI 301 may allow for selection of times to associate with the role, where transportation may be scheduled during the selected times. For example, a role may identify weekdays as allowable transportation times, while weekends are not. In another example, a role may identify solely weekdays during business hours as an allowable time period in which to request and schedule transportations. In one implementation, time period overlaps for different time periods are not allowed. In the case of an overlap, a popup message upon attempting to save the travel time control, where the popup message may state, for example: "There is an overlap between 'Time <X>' to 'Time <Y>', please fix the overlapping times." When an indication of acknowledgement of the popup message (e.g., by pressing an OK button on the GUI), the previously-entered data may remain on the GUI. However, the data may not be saved until the overlap is fixed. In one implementation, an unlimited amount of time constraints may be added by clicking on an "add another time" GUI element (e.g., link 310).

In one implementation, when an end user, such as an employee, utilizes the GUI to schedule travel controlled via a travel policy, the GUI may be provided via a user device of the end user. For example, the GUI may be presented via an application (may be referred to herein as a "travel application"), such as a mobile application or a web browser interface, to allow for the arrangement and/or ordering of travel under the travel policy. As described herein, companies may be able to restrict employees travel based on three categories (among others): business class control, travel time control, and monthly expense control.

In one implementation, the Business Class Control category may refer to a type of geographic entity, such as an automobile, or to a type of travel service level (e.g., first class, SUV, Black Car, etc.). In one implementation, end users (e.g., employees) accessing the travel application may be presented with a GUI that depicts the classes indicated as allowed by the employee's role (as ascertained from a data store maintained by the organization). If a class is not available, it may be disabled (greyed out) in the GUI presented via the travel application to the user. In some implementations, a class may not be available in a particular geographic area, or may not be available due to rule restrictions (e.g., see travel time controls).

In one implementation, the Travel Time Control category refers to time periods where travel is permitted for an end user. If a selected ride time is set to a disallowed time by a the pre-established travel policy of the company, a popup may be presented via a GUI on the user device to inform the end user that he or she is requesting transportation that is not within the allowed times. On the company website, a description of the times may be presented in the GUI using HTML. In the mobile application, the description of the times may be listed in a popup native to the specific operating system on the user device.

Figure 4A:
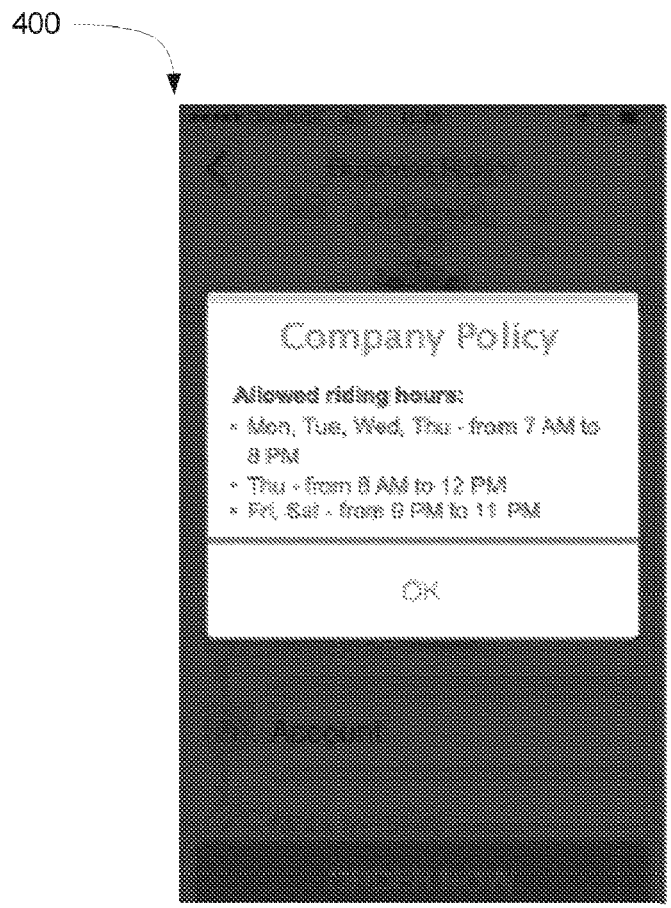
FIG. 4A is a block diagram illustrating a first graphical user interface illustrating a transport time message, according to an implementation.
Figure 4B:
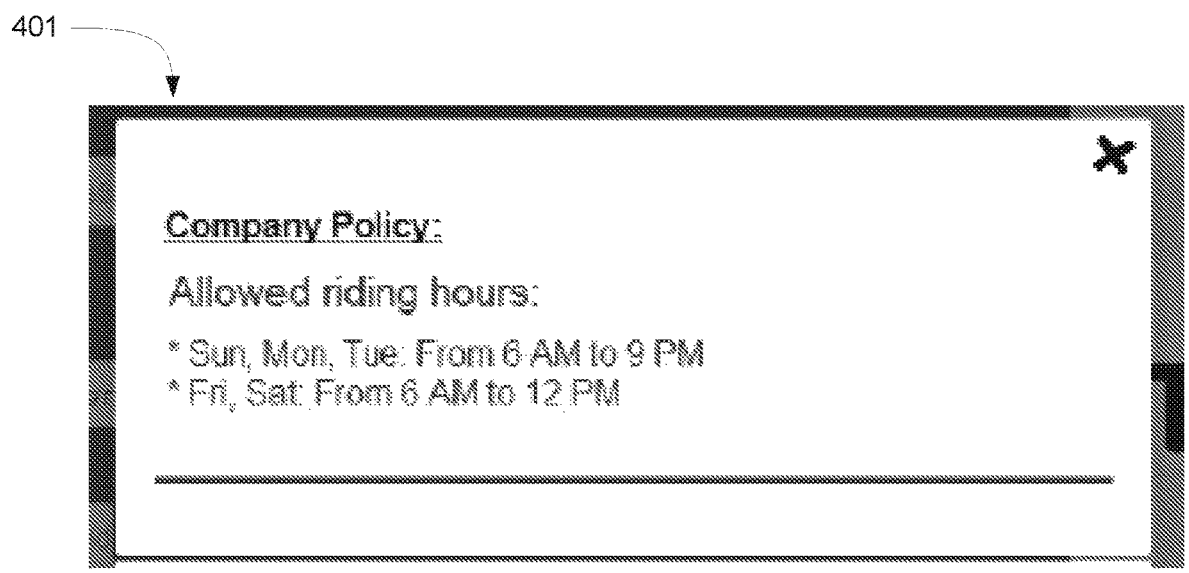
FIG. 4B is a block diagram illustrating a second graphical user interface illustrating a transport time message, according to an implementation.

In one implementation, each time restriction may be described in a separate line. FIG. 4A is an exemplary GUI 400 depicting a popup window on a mobile application (or web GUI) provided on a user device. The popup window may identify the allowed travel times per company policy and role. FIG. 4B is an exemplary GUI 401 depicting allowed travel time per company policy/role provided in a popup window on a web browser interface.

Figure 4C:
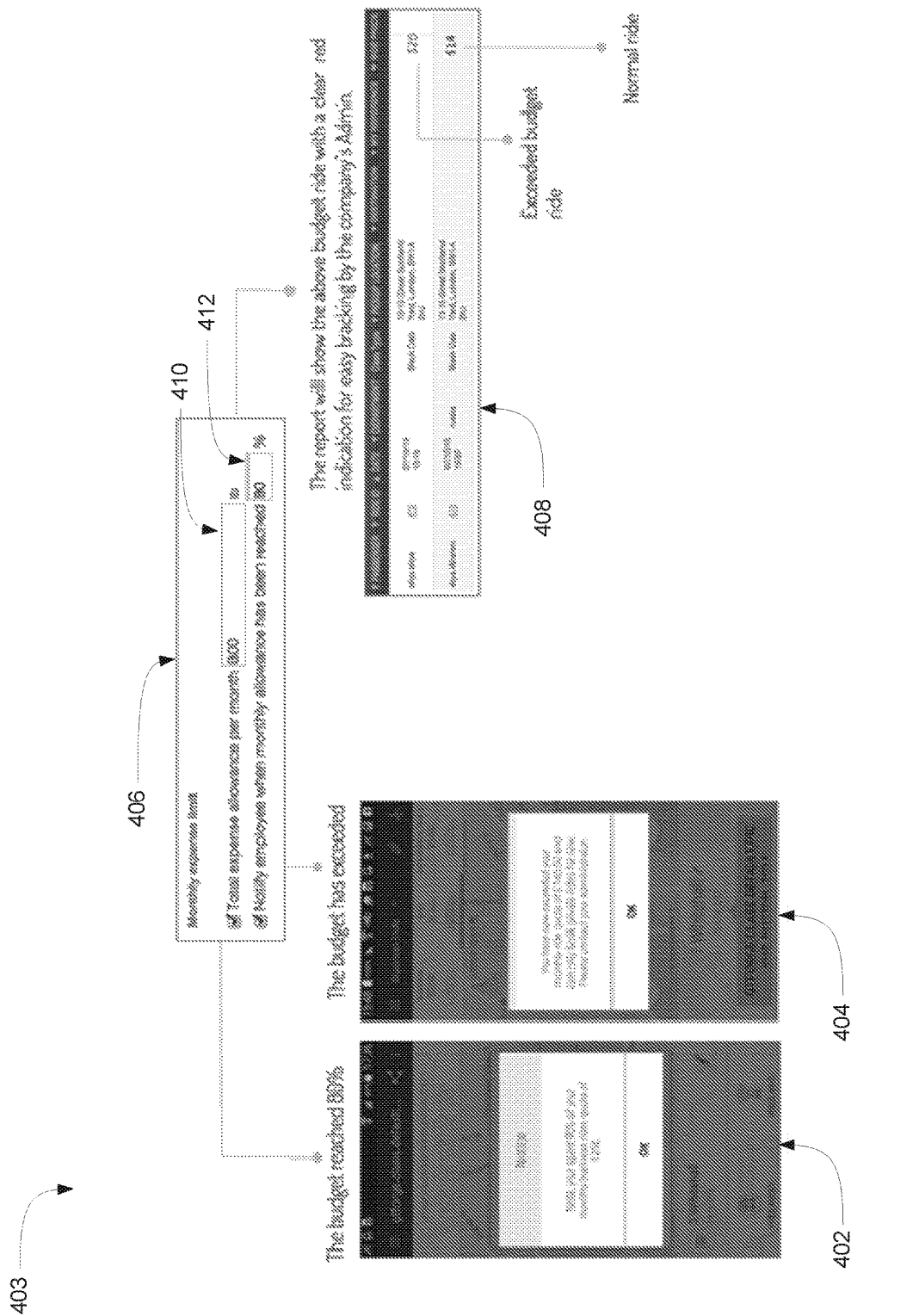
FIG. 4C is a block diagram illustrating a second graphical user interface for monthly expense control, according to an implementation.

In one implementation, the monthly expense control category refers to an allowed expense quota per role. FIG. 4C illustrates exemplary GUIs 403 used to implement a monthly expense control on both GUIs displayed to a company (e.g., 406, 408) and GUIs displayed to an end user (e.g., 402, 404). An administrator with editing privileges may set a monthly expense limit under the monthly expense control with a monetary limit 410. In addition, a control may also be provided to notify the employee when X % of the monthly allowance is reached 412. When more than X % of the quota is used by the employee, he or she may be notified for the exceeded amount at the end of the ride that was exceeded 402, as shown in FIG. 4C. In addition, the employee may also be provided a notification when his or her monthly expense limit has been exceeded 404, as shown in FIG. 4C. Popup notifications and email notifications may be sent to the employee's device when monthly expense limits have been reached. Notifications may be sent to another device belonging to a user associated with the employee (e.g., an administrative assistant), for example.

When the app is closed without a popup notification screen being viewed, the end user may miss the information included in the popup. As a result, in one implementation, whenever the the app is subsequently opened for the next business ride (or a business ride tab is selected in the case of a web browser implementation), the popup may be displayed again.

When an employee receives a notification that they are approaching his or her monthly expense limit, additional rides may still be allowed. In one implementation, if the cost of any current ride exceeds the remaining amount in the budget, the ride may be allowed to continue and the ride may be marked as exception in the company's report. In addition, once the budget has been exceeded the next ride may not be allowed at all. As such, the following message may be presented in the mobile application: "Your monthly quota (<Quota amount> <currency>) was exceeded. You can only book private rides for now. Please contact your administrator." In one implementation, to prevent the user from requesting rides that exceed the budget, the GUI element that allows a user to send a transport request (e.g., an "order ride" button or link) may be grayed out or otherwise disabled. In another implementation, the transportation request sent from the user's device is intercepted and not allowed to reach a third-party server. In yet another implementation, the server receiving the transportation request sent from the user device may send a notification to the user define indicating that the request is rejected.

In one example use of the roles feature, an employee may have a future booking in an allowed hour. The employee's role then changes and the future ride that he or she has ordered now fall in a disallowed time by the new role. In this case, the employee may still be allowed to make the ride. In another implementation, the user is sent a notification indicating that the previously-scheduled ride is no longer allowed.

In another example use of the roles feature, an employee moves from Role A to Role B, and the travel expense allowances for the roles are different. The following Table 1 details possible scenario and results of this implementation:

TABLE 1

| Role A Quota | Remaining Quota | Role B Quota | Allowed to take next ride? | If the next ride is future ride |
|---|---|---|---|---|
| 100 | 20 | 200 | Yes | NA |
| 100 | 20 | 100 | Yes | NA |
| 100 | 20 | 80 | No, popup given by new role's values | Allow future ride |
| 100 | 100 | 80 | Yes | NA |
| 200 | 20 | 100 | No, popup given by new role's values | Allow future ride |

Figure 5A:
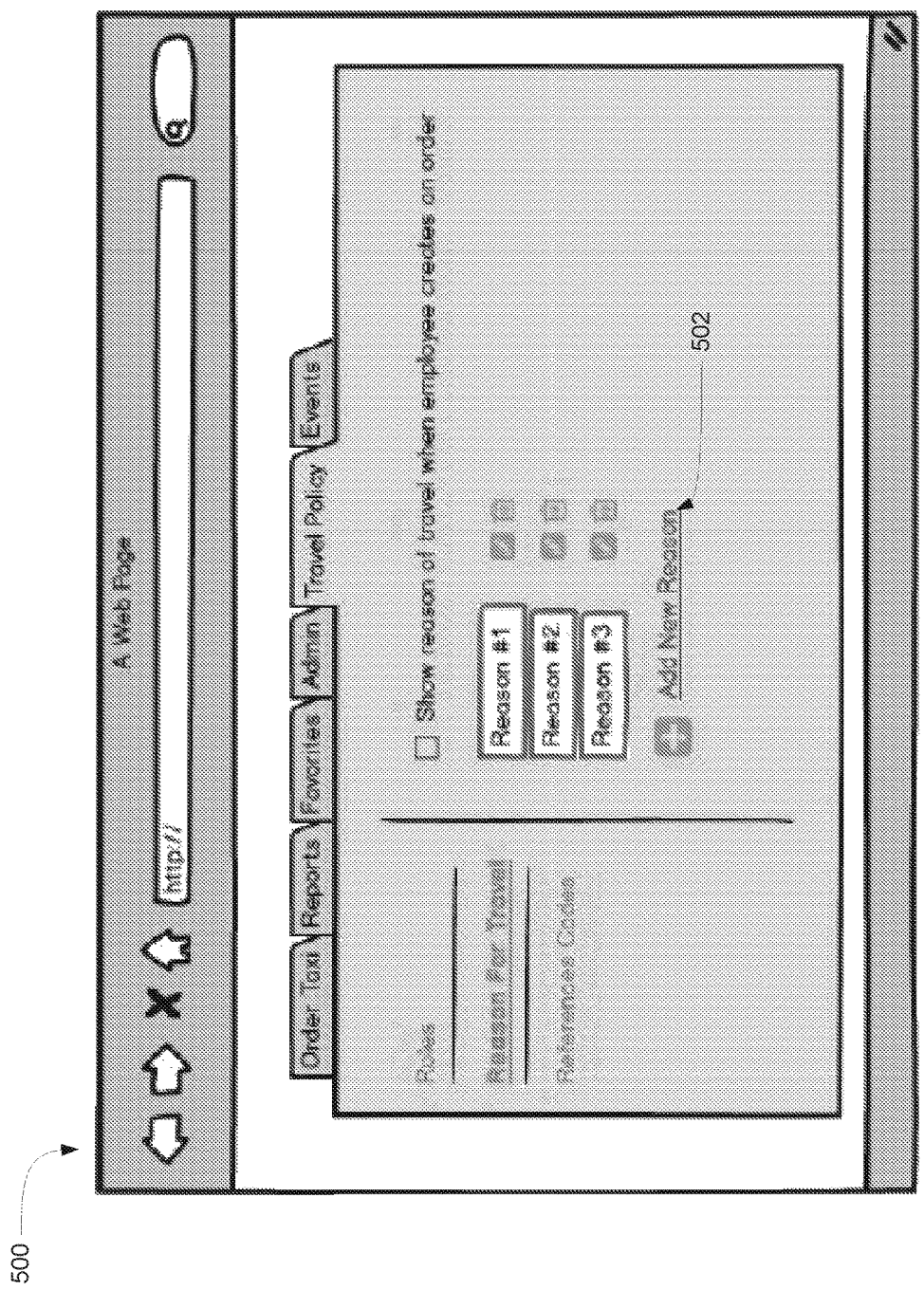
FIG. 5A is a block diagram illustrating a graphical user interface reasons for travel page, according to an implementation.

FIG. 5A is an exemplary GUI 500 depicting a setup page for Reasons for Travel according to company roles and travel policies. The company administrator may be able to add new reasons for travel 502 from the GUI shown in FIG.

5A. In one implementation, the company admin can establish up to five travel reasons in the GUI. In other implementations, any number of reasons for travel may be added. When a "show reason of travel" option is checked or selected, the field may appear in the mobile application as a mandatory field, thus prompting a user to provide a reason for travel before sending a transportation request. In one implementation, responsive to the number of reasons for travel being met, the "Add New Reason" GUI element 502 may be greyed out or otherwise disabled.

Figure 5B:
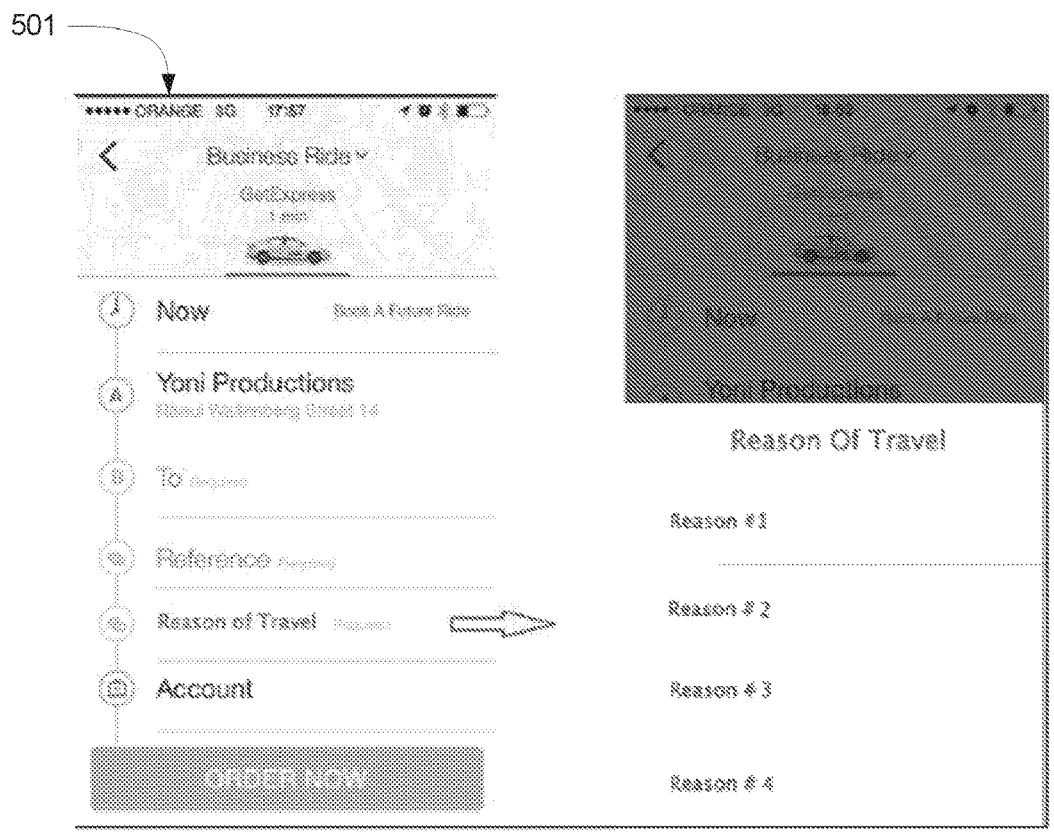
FIG. 5B is a block diagram illustrating a fifth graphical user interface reasons for travel page, according to an implementation.
Figure 5C:
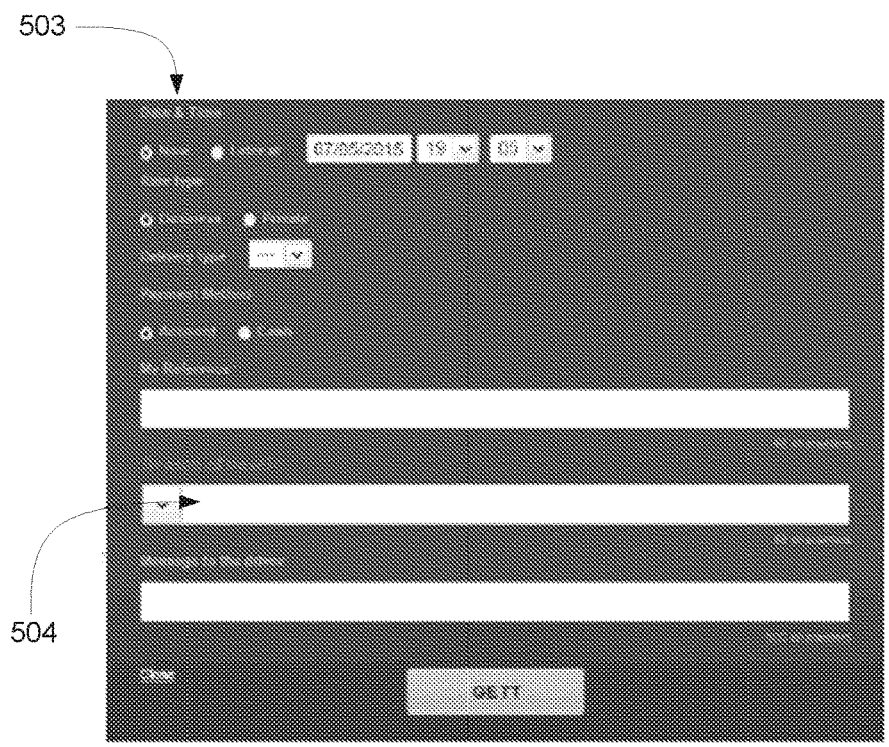
FIG. 5C is a block diagram illustrating a graphical user interface travel order screen, according to an implementation.
Figure 6:
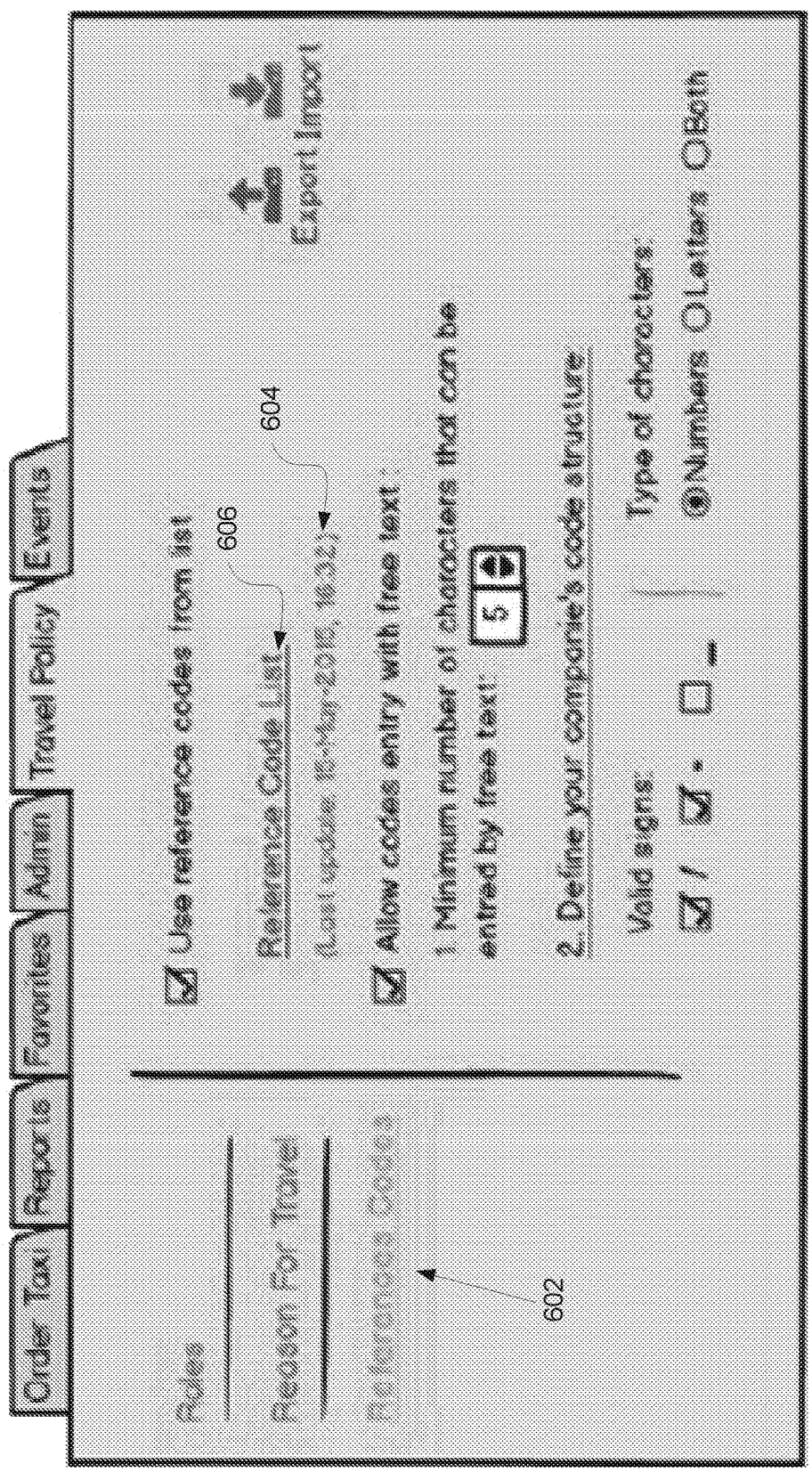
FIG. 6 is a block diagram illustrating a graphical user interface reference codes page, according to an implementation.

FIG. 5B is an exemplary GUI 501 depicting the Reasons of Travel as shown to an employee user on a mobile application (e.g., user device application). A user device of an employee user may display the GUI 501 of FIG. 5B when the employee user accesses the app to order transportation according to the travel policy of the company. Similarly, FIG. 5C is an exemplary GUI 503 of a travel order screen shown on a web browser interface on a user device, the GUI 503 including Reasons of Travel in a drop down list 504.

In one implementation, a travel policy GUI may include a "Reference" field. Companies that indicate reference field as mandatory may present the "Reference code" option 602 as shown in the exemplary GUI of FIG. 6A.

In one implementation, a company can add reference codes from a predefined imported code list (can be up to 20,000 ref codes, or greater). In the case of a predefined imported code list, if the company has already imported a list (e.g., a list that was imported via the customer care GUI) it may appear in this list. The company can also add reference codes by free text with limited characters (e.g., without importing a list).

Once the list is imported, the last update may be described next to the update's name (see 604 of FIG. 6A). The list can be viewed, edited, imported, and exported. In one implementation, importing a new list does not delete existing codes. In addition, if there are duplicated codes, they can be removed (i.e. keep one code) automatically or manually.

If an imported reference code list is selected, for example by selecting the "Reference Code List" hyperlink 606, a reference code list details GUI may be shown. In one implementation, the total number of references codes imported and/or manually-added may be displayed in the GUI. In one implementation, the list of reference codes may be displayed and sorted according to various sorting options (e.g., date added, alphabetically, etc.). Furthermore, each code may be deleted from the list and a single code may be added to the list.

When reference codes are entered manually (e.g., by free text), the GUI may allow administrators with editing privileges to enter references codes within the parameters allowed by the company. If the code entered by the user includes invalid characters, the invalid characters or code may be colored in red (or otherwise highlighted) and may not be set to the reference field.

In one implementation, roles include an expiration date. The role expiration date may refer to a date on which the role associated with an employee may no longer be valid as applied to the individual employee. In one implementation, the expiration date restriction may be edited by a SuperAdmin or an Admin. In other implementations, other permission settings may apply. In one implementation, a user can view the expiration date, without being able to edit it. If no date has been set, the expiration date field may be empty and no restriction may be enforced. The expiration date may be set per employee via the employees list, which may be imported by a company administrator.

Once the expiration date has been reached, the associated user may no longer be able to make business travel requests per the company's travel policy and roles. An employee user may be notified of the expiration of his or her role by a popup window sent to the user's device stating, for example, "Your company profile has expired. You can only book private rides for now. Please contact your administrator."

Figure 7:
FIG. 7 is a block diagram illustrating a graphical user interface expired employee profile page, according to an implementation.

In one example GUI (e.g., a GUI presented on a mobile device), when a role associated with a user has expired, a popup notification may be provided 704 and a GUI element to send a transport request (e.g., the ORDER NOW button) may be disabled (greyed), as shown in the left half of the exemplary GUI of FIG. 7. In the company web browser and/or mobile application GUI, a message 706 may appear at the top of the ordering form. In one implementation, the "GET TAXI" GUI element may be disabled 708 when the associated role has expired, as shown in the right half of the exemplary GUI of FIG. 7.

Figure 8:
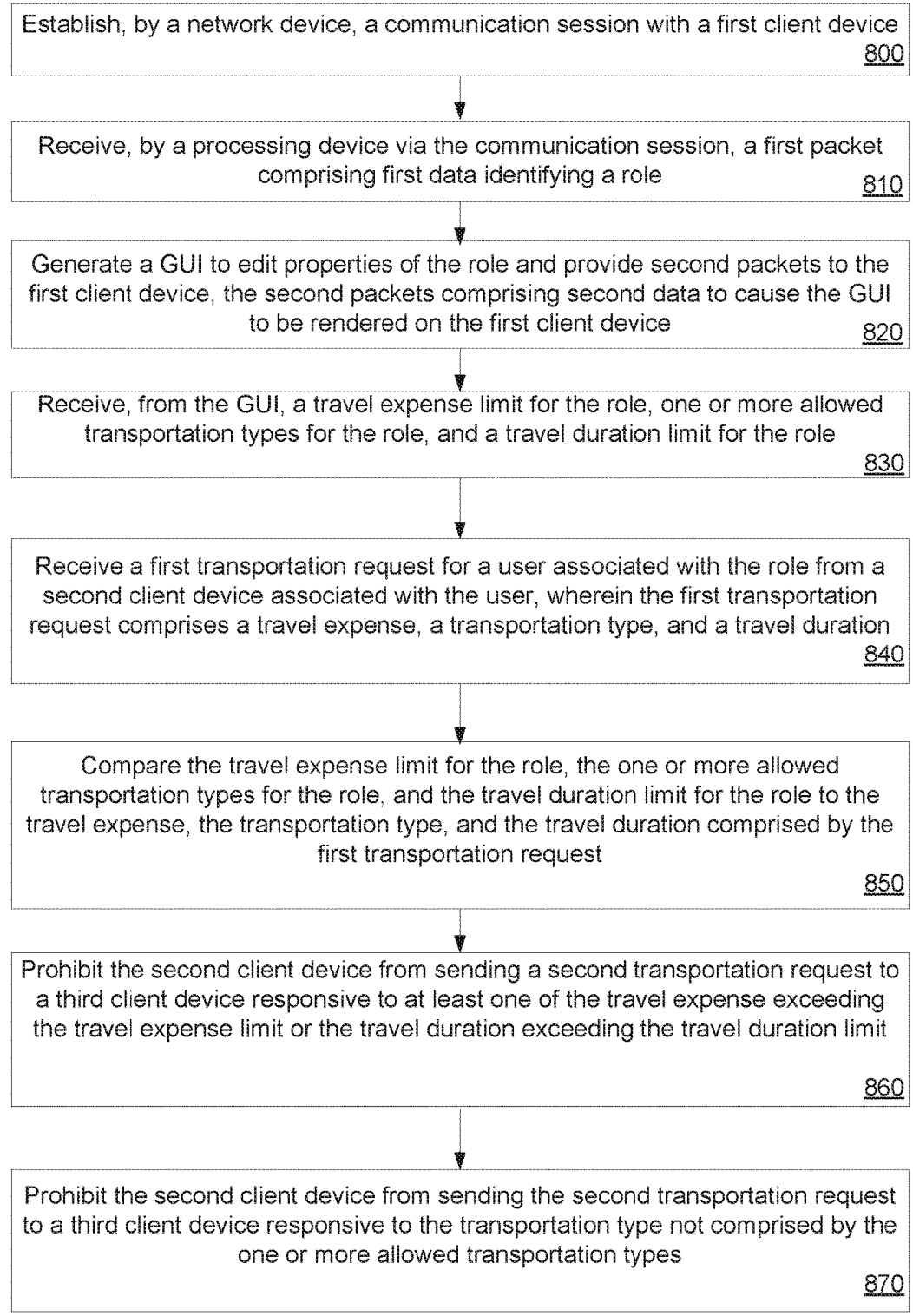
FIG. 8 is a flow diagram illustrating a graphical user interface for implementing controls for geographical conveyance processing flow, according to an implementation.

FIG. 8 is a flow diagram illustrating a method 801 for graphical user interface for implementing controls for geographical conveyance according to an embodiment of the disclosure. Method 801 may be performed by processing logic that may comprise hardware (e.g., circuitry, dedicated logic, programmable logic, microcode, etc.), software (such as instructions run on a processing device), firmware, or a combination thereof. In one embodiment, method 801 is performed by travel policy control component 115 of FIG. 1.

Method 801 begins at block 800 where processing logic establishes, by a network device, a communication session with a first client device. At block 810, processing logic receives, by a processing device via the communication session, a first packet comprising first data identifying a role. At block 820, processing logic generates, by the processing device, a graphical user interface (GUI) to edit properties of the role and provides, via the communication session, second packets to the first client device, the second packets comprising second data to cause the GUI to be rendered on the first client device. Processing logic at block 830 receives, by the processing device via the GUI generated and provided at block 820, a travel expense limit for the role, one or more allowed transportation types for the role, and a travel duration limit for the role. In one implementation, the travel expense limit for the role defines a total monetary threshold available for an associated user to spend on transportation over a certain time period (e.g., one month). Allowed transportation types may define a class of vehicles available to a user for transportation. The travel duration limit may define a quantity of time (e.g., in hours) that a user is allowed to spend in transport over a certain time period.

At block 840, processing logic receives, by the processing device, a first transportation request for a user associated with the role from a second client device associated with the user. In one implementation, the first transportation request includes a travel expense, a transportation type, and a travel duration. Processing logic at block 850 then compares the travel expense limit for the role, the one or more allowed transportation types for the role, and the travel duration limit for the role to the travel expense, the transportation type, and the travel duration comprised by the first transportation request.

At block 860, processing logic prohibits, by the processing device, the second client device from sending a second transportation request to a third client device responsive to at least one of the travel expense exceeding the travel expense limit or the travel duration exceeding the travel duration limit. In one embodiment, the second client device may be prohibited from sending the second transportation request to the third client device by rendering inactive a GUI element used to initiate the sending of the second transportation request. For example, a GUI element such as a button or link that initiates the sending of the second request may be greyed out (or otherwise rendered inoperable). In one implementation, the second transportation request is intended to be sent to a third client device not belonging to the owner of the first or second client device (e.g., a client device belonging to a third-party transportation company). In another embodiment, the third client device is the same as the second client device. In another implementation, processing logic prohibits the second client device from sending the second transportation request to the third client device by intercepting the sent second transportation request intended for the third client device, and thus not allowing the request to reach its intended destination. At block 870, processing logic prohibits, by the processing device, the second client device from sending the second transportation request to a third client device responsive to the transportation type not comprised by the one or more allowed transportation types.

FIG. 9A is a flow diagram illustrating a graphical user interface for implementing controls for geographical conveyance processing flow, according to an implementation. Method 900 may be performed by processing logic that may comprise hardware (e.g., circuitry, dedicated logic, programmable logic, microcode, etc.), software (such as instructions run on a processing device), firmware, or a combination thereof. In one embodiment, method 900 is performed by travel policy control component 115 of FIG. 1.

Beginning at block 910, processing logic receives, from the GUI of the first client device, a first warning percentage threshold corresponding to the travel expense limit and a second warning percentage threshold corresponding to the travel duration limit. In one implementation, the first warning percentage threshold and the second warning percentage threshold are thresholds that determine when a user should be notified that he or she is approaching their travel expense limit and their travel duration limit, respectively. Multiple warning percentage thresholds may be set for each threshold defined. At block 920, processing logic transmits, via a warning GUI, a warning notice to the second client device responsive to the user exceeding at least one of the first warning percentage threshold or the second warning percentage threshold. In one embodiment, the warning notice may be in the form of a pop-up window, a push notification, a message sent to a message center, etc.

FIG. 9B is a flow diagram illustrating a travel policy controls travel time restriction for an employee rides processing flow, according to an implementation. Method 901 may be performed by processing logic that may comprise hardware (e.g., circuitry, dedicated logic, programmable logic, microcode, etc.), software (such as instructions run on a processing device), firmware, or a combination thereof. In one embodiment, method 901 is performed by travel policy control component 115 of FIG. 1.

Beginning at block 940, processing logic receives, from the first client device, a first travel time restriction for the role, wherein the first travel time restriction indicates a time interval during which users associated with the role may travel. The first travel time restriction may define, in terms of days of the week, hours of the day, or days of the month and/or year, a time during which employees associated with the corresponding role may be transported. In one implementation, multiple travel time restrictions may be created for a role. At block 950, processing logic determines that the first travel time restriction does not comprise a transportation time associated with the first transportation request. In one implementation, the first travel time request may include a scheduled time for transportation. In this way, transportation requests initiated during a time in which travel is restricted may still be allowed if the requested transportation is scheduled for a time in which transportation is not restricted. \

At block 960, in response to the determining (of block 950), processing logic transmits a message to the second client device indicating that the requested transportation is not allowed, and prohibits the second client device from sending the second transportation request to the third client device. Processing logic may prevent the sending of the second transportation request to the third client device as described with respect to FIG. 9A.

Figure 10:
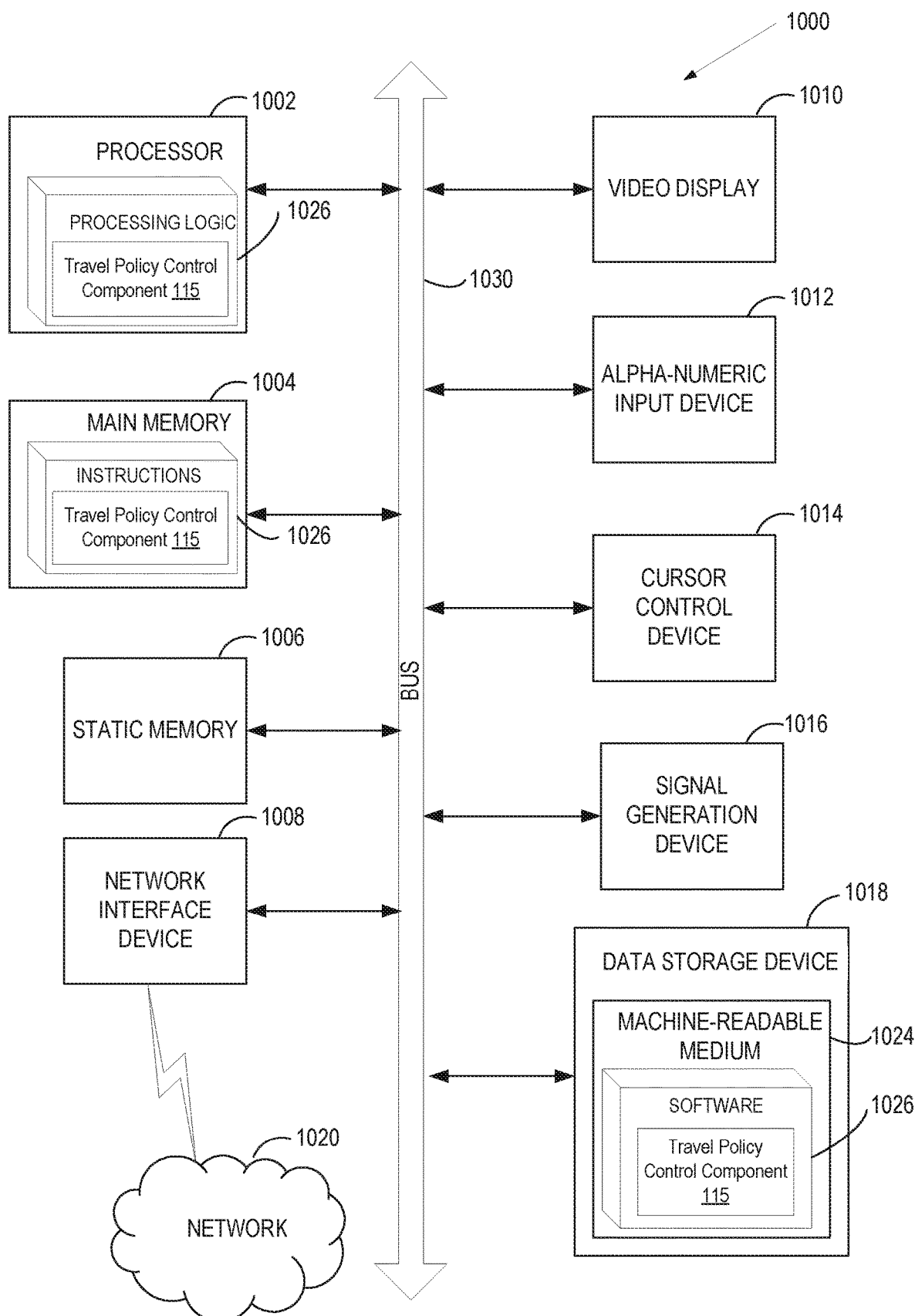
FIG. 10 is a block diagram of an example computer system that may perform one or more of the operations described herein.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002, a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 1026 for performing the operations and steps discussed herein.

The computer system 1000 may further include a network interface device 1008 communicably coupled to a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-accessible storage medium 1024 on which is stored software 1026 embodying any one or more of the methodologies of functions described herein. The software 1026 may also reside, completely or at least partially, within the main memory 1004 as instructions 1026 and/or within the processing device 1002 as processing logic 1026 during execution thereof by the computer system 1000; the main memory 1004 and the processing device 1002 also constituting machine-accessible storage media.

The machine-readable storage medium 1024 may also be used to store instructions 1026 to implement a travel policy control component 115 to implement travel policy control for employee rides and/or a software library containing methods that call the above applications, such as travel policy control component 115 described with respect to FIG. 1. While the machine-accessible storage medium 1028 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   receiving, by a processing device of a transportation server from an administrative computing device, one or more transportation parameters associated with a user type;
   receiving, by the processing device from a client computing device associated with a user associated with the user type, a transportation request for a transportation vehicle;
   comparing, by the processing device, the transportation request of the user associated with the user type to the one or more transportation parameters associated with the user type; and
   prohibiting, by the processing device, communication of the transportation request of the user associated with the user type to one or more vehicle computing devices responsive to the transportation request not satisfying the one or more transportation parameters associated with the user type.

2. The method of claim 1 further comprising:
allowing, by the processing device, the communication of the transportation request to the one or more vehicle computing devices responsive to the transportation request satisfying the one or more transportation parameters.

3. The method of claim 1, wherein the prohibiting of the communication of the transportation request comprises disabling a graphical user interface (GUI) element displayed via the client computing device, wherein the GUI element is for the communication of the transportation request to the one or more vehicle computing devices.

4. The method of claim 1, wherein the prohibiting of the communication of the transportation request comprises intercepting the transportation request sent by the client computing device.

5. The method of claim 1, wherein the prohibiting of the communication of the transportation request comprises transmitting a notification to the client computing device indicating the transportation request is rejected.

6. The method of claim 1 further comprising causing the client computing device to display an order screen via a graphical user interface (GUI), wherein the receiving of the transportation request comprises receiving a transportation order entered via the order screen, wherein the transportation order is pre-filled with a location of the client computing device.

7. The method of claim 1, wherein the one or more transportation parameters comprise a travel expense limit for the user type, wherein the transportation request is associated with a travel expense.

8. The method of claim 1, wherein the one or more transportation parameters comprise one or more allowed transportation types for the user type, wherein the transportation request is associated with a transportation type.

9. The method of claim 1, wherein the one or more transportation parameters comprise a travel duration limit for the user type, wherein the transportation request is associated with a travel duration.

10. A system comprising:
a memory; and
a processing device operatively coupled to the memory, the processing device is configured to:
receive, from an administrative computing device, one or more transportation parameters associated with a user type;
receive, from a client computing device associated with a user associated with the user type, a transportation request for a transportation vehicle;
compare the transportation request of the user associated with the user type to the one or more transportation parameters associated with the user type; and
prohibit communication of the transportation request of the user associated with the user type to one or more vehicle computing devices responsive to the transportation request not satisfying the one or more transportation parameters associated with the user type.

11. The system of claim 10, wherein the processing device is further to allow the communication of the transportation request to the one or more vehicle computing devices responsive to the transportation request satisfying the one or more transportation parameters.

12. The system of claim 10, wherein to prohibit the communication of the transportation request, the processing device is to disable a graphical user interface (GUI) element displayed via the client computing device, wherein the GUI element is for the communication of the transportation request to the one or more vehicle computing devices.

13. The system of claim 10, wherein to prohibit the communication of the transportation request, the processing device is to intercept the transportation request sent by the client computing device.

14. The system of claim 10, wherein to prohibit the communication of the transportation request, the processing device is to transmit a notification to the client computing device indicating the transportation request is rejected.

15. A non-transitory computer readable medium storing instructions, which when executed cause a processing device to:
receive, from an administrative computing device, one or more transportation parameters associated with a user type;
receive, from a client computing device associated with a user associated with the user type, a transportation request for a transportation vehicle;
compare the transportation request of the user associated with the user type to the one or more transportation parameters associated with the user type; and
prohibit communication of the transportation request of the user associated with the user type to one or more vehicle computing devices responsive to the transportation request not satisfying the one or more transportation parameters associated with the user type.

16. The non-transitory computer readable medium of claim 15, wherein the processing device is further to allow the communication of the transportation request to the one or more vehicle computing devices responsive to the transportation request satisfying the one or more transportation parameters.

17. The non-transitory computer readable medium of claim 15, wherein to prohibit the communication of the transportation request, the processing device is to disable a graphical user interface (GUI) element displayed via the client computing device, wherein the GUI element is for the communication of the transportation request to the one or more vehicle computing devices.

18. The non-transitory computer readable medium of claim 15, wherein to prohibit the communication of the transportation request, the processing device is to intercept the transportation request sent by the client computing device.

19. The non-transitory computer readable medium of claim 15, wherein to prohibit the communication of the transportation request, the processing device is to transmit a notification to the client computing device indicating the transportation request is rejected.

* * * * *